March 9, 1937. S. M. DEL CAMP 2,073,466

ELECTRICAL WIRING INSTALLATION AND CONTACT LUG

Filed May 10, 1935

Inventor:
Scipione M. Del Camp,
by Walter P. Jones
Atty.

Patented Mar. 9, 1937

2,073,466

UNITED STATES PATENT OFFICE 2,073,466

ELECTRICAL WIRING INSTALLATION AND CONTACT LUG

Scipione M. Del Camp, Maywood, Ill., assignor to Cinch Manufacturing Corporation, Chicago, Ill., a corporation of Illinois Application May 10, 1935, Serial No. 20,735

2 Claims. (Cl. 173—324)

My invention relates to a wiring installation and contact lugs for the same.

The preferred embodiment of my invention is disclosed in the accompanying drawing, in which.

My invention aims to provide a series of contact lugs, preferably made out of sheet metal and having a suitable portion to which electric wires may be attached, and a means integral with the contact lugs whereby they may be easily and quickly attached to a strip of insulating material.

Figure 1:
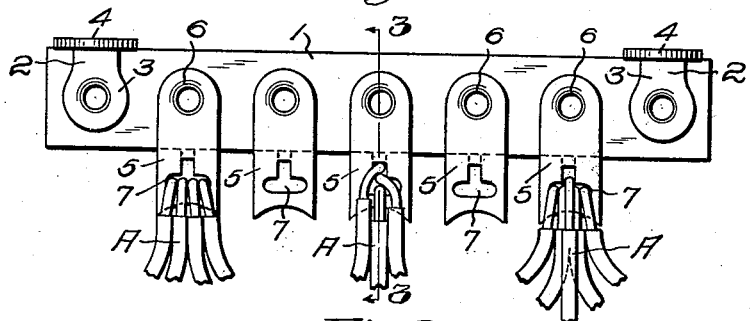
Figure 1 is a top plan view of my wiring installation with wires attached.
Figure 2:
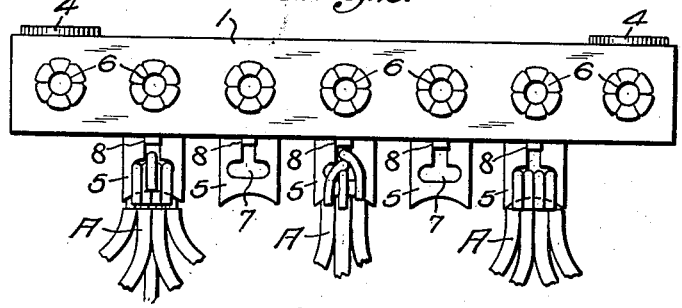
Fig. 2 is a bottom plan view of my wiring installation with wires attached.

Referring to the drawing, I have shown in Fig. 1 and Fig. 2 a strip of non-conducting material 1. I prefer that this strip be bakelite, but any other suitable insulating material will do. As a means for attaching the strip 1 to a supporting structure, I have shown a bracket 2 having a portion 3 riveted to the strip 1, its opposite portion 4 extending at right angles from the portion 3 and adapted to be secured in any suitable manner to a supporting structure. I do not wish to limit myself to this method of attaching the insulating strip to the supporting structure, but realize that this may be accomplished by any suitable method.

I have provided a series of contact lugs 5, such as are used in a radio set and like apparatus to connect up electric circuits. These lugs 5 are preferably attached to the strip 1 by means of integral eyelet rivets 6.

Figure 3:
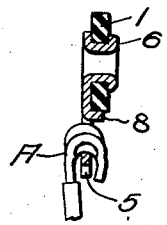
Fig. 3 is a section taken along the line 3—3 of Fig. 1.
Figures 4, 5, 6:
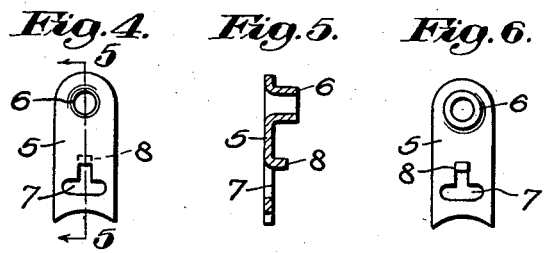
Fig. 4 is a view of my contact lug taken from the front.
Fig. 5 is a section of my contact lug taken on the line 5—5 of Fig. 4.
Fig. 6 is a view of my contact lug taken from the back.

Referring in more detail to the contact lug 5, as shown in Figs. 4, 5 and 6, I prefer a thin elongated lug formed from suitable conducting sheet material. From one end of the lug I have drawn out the barrel-shaped eyelet 6. This eyelet is adapted to be inserted in an aperture in the insulating strip, the outer edge is then bent over by a suitable tool and the contact lug is thereby firmly riveted to the insulating strip. An aperture 7, preferably T-shaped, is punched from the opposite end of the lug to the eyelet 6, and, at the same time and from part of the same material punched from the lug to form the aperture 7, a finger-shaped projection 8 is pressed outwardly. The projection 8 extends from an edge surrounding the T-shaped aperture and is located at a spaced distance from the eyelet 6. To insure the lugs 5 from swinging laterally toward each other, the projections 8 are adapted, due to their spaced position from the eyelet 6, to bear against the lower edge of the strip 1, as shown in Fig. 3, thereby maintaining the plates in substantially fixed position. Although I have chosen to space the lugs apart by means of the elements 8, I do not wish to limit myself thereby because I realize that this might be done in any other suitable manner.

To the T-shaped apertures 7, I have attached a plurality of wires as shown in Figs. 1, 2 and 3, one of the wires in each group, which I have illustrated as A in the drawing, may be a conductor which leads to an electrical circuit common to all the other wires fastened to that particular contact lug, the remaining wires in the group may lead to various electrical contacts in the set. As the wires will approach the plate from different directions, I prefer that the apertures be of a T-shape in order that there be a minimum of confusion, one wire end with another, at the point of common attachment. The lower ends of the contact lugs are curved slightly to aid in holding the wires together prior to soldering them in place. While I have not shown the solder because it would confuse the invention, it is to be understood that I prefer to use it to hold the wires securely in place.

The T-shaped slots are particularly useful because they may receive and hold a bunch of wires in a horizontal position (Fig. 1, the left-hand lug), a vertical position (Fig. 1, the middle lug), or both horizontally and vertically as shown by the right-hand lug in Fig. 1. By this arrangement, the wires also may be more easily traced when they have once been attached.

To assemble the contact lugs with the insulating strip, suitable apertures are made in the insulating strip at a spaced distance apart. The eyelets of the contact lugs are inserted in the apertures and riveted to the part to which they are attached.

The device which I have illustrated and described is reduced to a minimum number of parts which may be manufactured with ease and at a relatively low cost and can be easily and quickly assembled.

While I have illustrated and described a preferred embodiment of my invention, I do not wish to be limited thereby, because the scope of my invention is best defined by the following claims:

1. An elongated contact lug of thin conducting material having an eyelet barrel formed in one end thereof for attachment to insulating material, said lug having a T-shaped aperture at a distance spaced from said eyelet for the reception of a plurality of conductors, the width of the passages constituting said T-shaped aperture corresponding substantially to the width of the conductors so that said plurality of conductors may be grouped therein in substantial alignment, and a finger-shaped projecting element extending at an angle to said lug and formed from the metal removed to form said aperture, said projecting element adapted for engagement with the insulating material to prevent rotation of the contact lug relative thereto.

2. An elongated one-piece contact lug of thin conducting material having integral projecting means at one end for attachment to an insulating support, the end of said lug remote from said attaching means having an aperture for the reception of a plurality of conductors, said opening being characterized by being formed of a plurality of intersecting apertures disposed at an angle to one another for receiving a plurality of conductors in substantially side-by-side alignment, and a finger-shaped projecting element formed of metal removed to form a portion of said conductor-receiving opening and adapted for engagement with the insulating material to prevent rotation of the contact relative thereto.

SCIPIONE M. DEL CAMP.